July 21, 1942.　　　J. MERCIER　　　2,290,479
HYDRAULIC CONTROL SYSTEM
Filed May 15, 1940
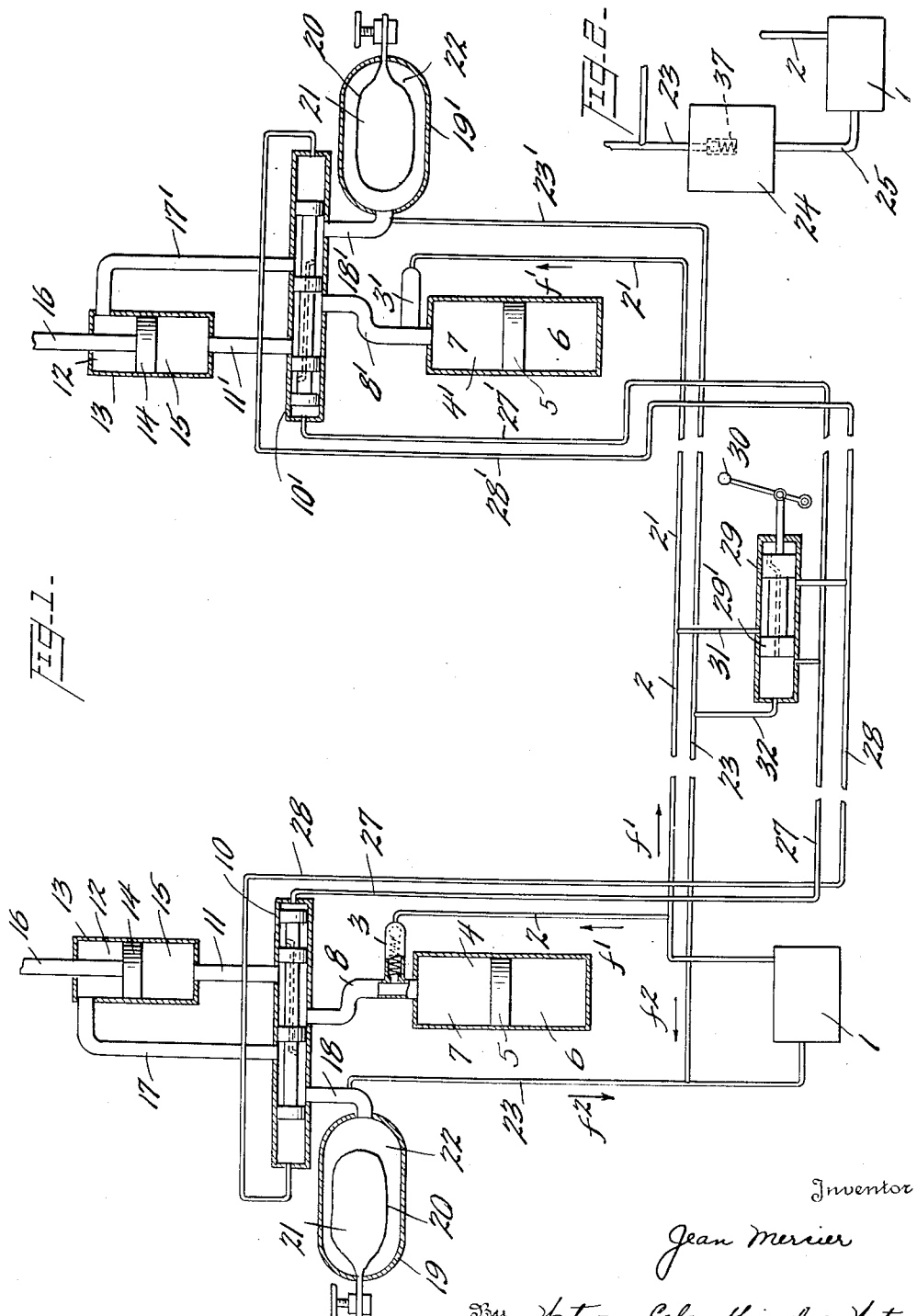
Inventor
Jean Mercier
By Watson, Cole, Grindle & Watson
Attorney Patented July 21, 1942

2,290,479

UNITED STATES PATENT OFFICE 2,290,479

HYDRAULIC CONTROL SYSTEM

Jean Mercier, Neuilly-sur-Seine, France

Application May 15, 1940, Serial No. 335,384
In France June 2, 1939

5 Claims. (Cl. 60—51)

The present invention relates to hydraulic control systems of the quick acting type such as are employed, in particular, in cases in which the pressure generator, consisting, for instance, of a pump, is located at a great distance from two or more places where this pressure is to be utilized, the pressure serving to actuate, as quickly as possible, elements which are relatively heavy.

This is in particular the case of heavy airplanes, such as air liners or bombers, in which the two landing gears, the rudder, and other parts are operated from a central pressure generator.

Obviously, in such systems, the pressure generator must be made very powerful, and is consequently relatively heavy, if it is desired to operate parts which are heavy. Furthermore, if the pressure generator is located at a relatively great distance from the parts to be operated, it is necessary to provide conduits of relatively large section, for the transmission of large amounts of fluid under pressure as necessary for the quick operation of the parts.

On the other hand, if conduits or pipes of large diameter are to be capable of withstanding high pressures, averaging from 300 to 500 kgs. per square centimeter, their walls must be thick.

It follows that the whole of the hydraulic control system, including the generator and the conduits, becomes very heavy and occupies considerable room. Furthermore it necessitates a great volume of fluid for filling up the whole of the circuit. This considerable volume occupied and this heavy weight often make it very difficult, if not impossible, to employ hydraulic control systems of the type above referred to on aircraft.

The object of the present invention is to provide a hydraulic control system which avoids the drawbacks above mentioned and, generally speaking, which is better adapted to meet the requirements of practice than those used for the same purpose up to the present time.

According to an essential feature of the present invention, I provide a hydraulic servo-control device between the pressure generator and each of the parts to be actuated, and associate two pressure accumulators, to wit a high pressure accumulator and a low pressure accumulator, with each servo-control device. Each high pressure accumulator is fed from a central pressure generator, such as a pump, of relatively low output, through a conduit of small section. The high pressure accumulator acts, as a large output source of high pressure, through a conduit of large section, on the part to be actuated, in order to obtain quick operation thereof. The high pressure accumulators receive the fluid under pressure at a relatively low rate of feed during the intervals (which are relatively long) between successive operations of the parts.

The low pressure accumulator of each device (pressure of some kilograms per square centimeter) is inserted in the fluid return circuit leading to the pressure generator or its reservoir, and it serves to receive the fluid escaping from the part to be actuated. This low pressure accumulator is also connected to the part to which it is associated through a conduit of large section. On the other hand it is connected to the high pressure generator (which is located at a distance therefrom) through a conduit of small section, either directly or with the interposition of a fluid reservoir.

The connections between each pair of high pressure and low pressure accumulators and the part to which it is associated are controlled by a distributing valve interposed between the accumulators and the part to be operated (consisting for instance of jacks), and each distributing valve can be operated either directly or from one distant central control element.

If the low pressure accumulator is directly connected with the suction side of the pressure generator, consisting for instance of a pump, the hydraulic circuit is wholly separated from atmospheric air, and the pump is always primed, under the effect of the pressure existing in the low pressure accumulators, even if the pump is above the accumulators.

The system according to the invention has the advantage of permitting the use of a small and light pump, and of conduits of small section, whereby the weight of the system and the space it occupies are materially reduced. In the system according to the invention, the only conduits to be made of relatively large section are the conduits connecting the parts to be operated to the corresponding accumulators. As the latter are disposed close to the former, these portions of large section correspond to only a small part of the whole circuit.

Other features of the present invention will result from the following detailed description of a specific embodiment thereof.

An embodiment of the present invention is hereinafter described by way of example, with reference to the accompanying drawing in which:

Figure 1 is a diagrammatic view of a hydraulic control system made according to the invention; and Figure 2 is a partial view showing a modification.

In the illustrated embodiment a pump 1 serves to supply oil under high pressure. The oil is delivered, through conduits 2 and 2' of small section, at a pressure of, say, 500 kgs. per square centimeter. The supply conduits 2 and 2' are conected to accumulators 4 and 4', with the interposition of check valves 3 and 3' adapted to open only in the direction of arrows $f^1$.

Accumulators 4 and 4' are oil-and-air accumulators, each being separated into two chambers 6 and 7 by a movable partition, such for instance as a piston 5. Chamber 6 is filled with a gas, as air, and chamber 7 receives the oil from the pump 1.

The chambers 7 of accumulators 4 and 4' are connected, through conduits 8 and 8', to distributing devices such as slide valves 10 and 10'.

The distributing valves 10 and 10' are connected, through conduits 11 and 11' to chambers 15 and 15' of two jacks, each of which includes a cylinder 13 and a piston 14 separating the cylinder into two chambers 12 and 15. The rods 16 of pistons 14, which extend, with the interposition of suitable packing means, through the wall of cylinders 13, act on the parts to be operated, such as a retractable landing gear, wing flaps, rudders, and so on, when the system is used in connection with an aircraft.

Each chamber 12 of jacks 13 is connected, through conduits 17 and 17', to° distributing valves 10 and 10'. These distributing valves are connected, through conduits 18 and 18', to low pressure accumulators 19 and 19'.

In the example shown by the drawing, the low pressure accumulators are air-and-oil accumulators in which the partition 20 which separates each of them into two chambers 21 and 22 is made of a deformable material such as a rubber compound which is not attacked by the selected liquid.

Conduits 8, 8', 11, 11', 17, 17', and 18, 18', which open into the distributing valves 10 and 10', are of large diameter, so as to permit the flow of large amounts of liquid, whereby jacks 13 are operated at high speed.

The low pressure accumulators 19 and 19' are connected to pump 1 through conduits 23 and 23' of small section preferably branching off from conduits 18 and 18' at points close to accumulators 19 and 19'. Thus the fluid circuit is wholly separated from atmospheric air, and the pump is constantly primed under the effect of the low pressure existing in the low pressure accumulators 19 and 19' (this pressure averaging, for instance, up to 10 kgs. per square centimeter) even if the pump is above the accumulators. This advantage is particularly important when systems of this kind are to be applied on aircraft, which are liable to assume very important inclinations in all directions.

Instead of directly connecting accumulators 19 and 19' to pump 1, I may arrange conduits 23 and 23' to open into a reservoir such as 24, shown in Figure 2, this reservoir being, in turn, connected through a conduit 25 to pump 1, located under it. In this case, I preferably provide on conduit 23 a check valve 37 which opens only toward the outside (direction of arrow $f^2$) but which prevents the inflow of fluid or air into said pipe, from the opposite direction.

Slide valves 10 and 10' can be controlled either directly by means of levers projecting to the outside or through one remote control device such as that illustrated. According to this embodiment, the two opposite sides of distributing valves 10 and 10' are respectively connected through conduits 27 and 27', 28 and 28' to one hydraulic control device 29, operated by means of a lever 30 operatively connected to slide valve 29'. According to the position of this slide valve, conduits 28 and 28' can be connected to the high pressure side of the pump to which the valve is connected by conduit 31 branching off from conduit 2, while 27 and 27' are connected to the low pressure side of the pump to which the valve is connected through a conduit 32 branching off from conduit 23, or vice-versa.

This arrangement is of advantage when a hydraulic system according to the invention is applied on aircraft. In that case the pump may be associated with one of the engines of a plane. A pair of accumulators 7, 7' and 20, 29', a control valve 10 and a jack may be located in either wing of the plane, for instance, for the operation of the landing gear. The remote control device 29 may be installed at the cockpit. The system can be further extended by addition of similar installations for other members to be operated correspondingly. This applies in the example given to a third double pair of pipes, a third pair of accumulators, a third control valve and a third jack provided in the tail of the ship for the lowering and retracting of the third wheel of the plane.

The invention can be used whenever hydraulic operation of two or more servo-motors in connection with one fluid pressure generator is desired. It is of special advantage if the servo-motors are operated in the same way and if their control from a distant central point is desired.

In a general manner, while I have, in the above description, disclosed what I deem to be a practical and efficient embodiment of the present invention, it should be well understood that I do not wish to be limited thereto as there might be changes made in the arrangement, disposition and form of the parts without departing from the principle of the present invention as comprehended within the scope of the appended claims.

What I claim is:

1. A hydraulic control system for operating a plurality of elements disposed at spaced locations, comprising a hydraulic pressure generator, a high pressure accumulator adjacent each said element, conduit means of relatively small section connecting said pressure generator with each said high pressure accumulator, conduit means of relatively large section connecting each said high pressure accumulator with the adjacent element to be operated, a low pressure accumulator adjacent each said element, conduit means of relatively large section connecting each said element with said adjacent low pressure accumulator, means for controlling the communication of each said element with the adjacent accumulators, and conduit means of relatively small section connecting each said low pressure accumulator with the inlet of said pressure generator.

2. A hydraulic control system according to claim 1, including a fluid reservoir in the conduit connecting the low pressure accumulators with the inlet side of the pressure generator.

3. A hydraulic control system according to claim 1, including a check valve in each conduit connecting the pressure generator with the high pressure accumulators, each said check valve being disposed adjacent the respective accumulator.

4. A hydraulic control system according to claim 1, including remote control means for actuating said means for controlling the communication of each said element with the adjacent accumulators, said communication controlling means being adapted for fluid pressure actuation.

5. A hydraulic control system according to claim 1, including remote control means for actuating said means for controlling the communication of each said element with the adjacent accumulators, said communication controlling means being adapted for fluid pressure actuation and being connected by conduits of small section with the high pressure and low pressure sides of said pressure generator, and said remote control means comprising manually operated valve means controlling said last mentioned conduits.

JEAN MERCIER.